June 30, 1936.    A. L. SPRECKER    2,046,005
AUTOMATIC SCALE
Filed Nov. 18, 1932    2 Sheets-Sheet 1

INVENTOR-
Alfred L. Sprecker
BY
W. M. Wilson
ATTORNEY-

June 30, 1936.  A. L. SPRECKER  2,046,005
AUTOMATIC SCALE
Filed Nov. 18, 1932  2 Sheets-Sheet 2
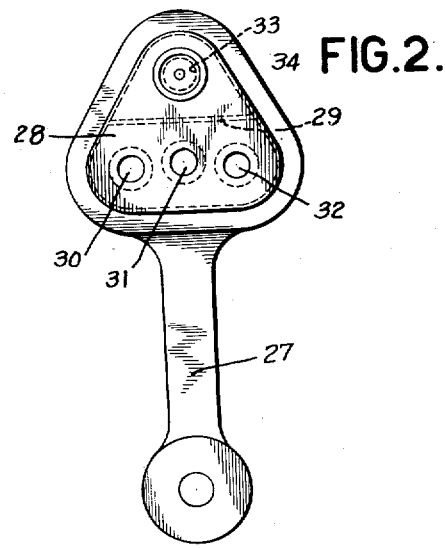
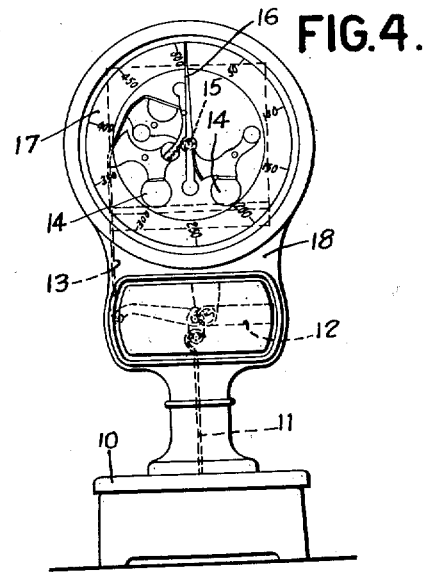
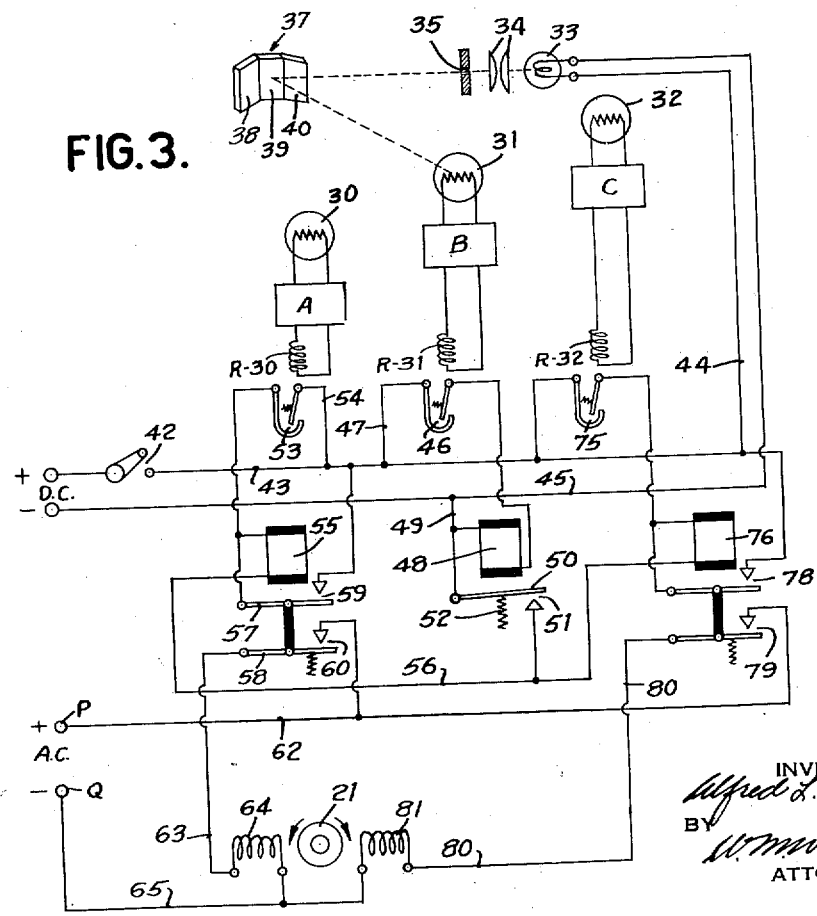
INVENTOR
Alfred L. Sprecker
BY
W. M. Wilson
ATTORNEY Patented June 30, 1936

2,046,005

UNITED STATES PATENT OFFICE 2,046,005

AUTOMATIC SCALE

Alfred L. Sprecker, Freeport, N. Y., assignor, by mesne assignments, to International Business Machines Corporation, New York, N. Y., a corporation of New York Application November 18, 1932, Serial No. 643,182

14 Claims. (Cl. 265—5)

This case relates to weighing scales for controlling auxiliary mechanism.

The object of the invention is to provide a scale with a novel control for auxiliary mechanism.

Further, the object is to provide a scale having a position varying with the load with a novel control for auxiliary mechanism, which control will have no effect on the weighing operation.

Still further, the object is to provide the scale with an automatic follow-up mechanism to follow the movement of the scale.

The object is also to provide a scale having a part movable to different load points to control a photocell mechanism for following the scale part to its load point.

Further, the object is also to provide a scale with a part movable to different load points for controlling a photocell mechanism to move in either direction to follow the scale part to the load point.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 2 is a front view of a detail of the follow-up mechanism;

Fig. 3 is the circuit diagram of the machine; and

Fig. 4 is a front view of the scale to which the invention has been applied.

Figure 1:
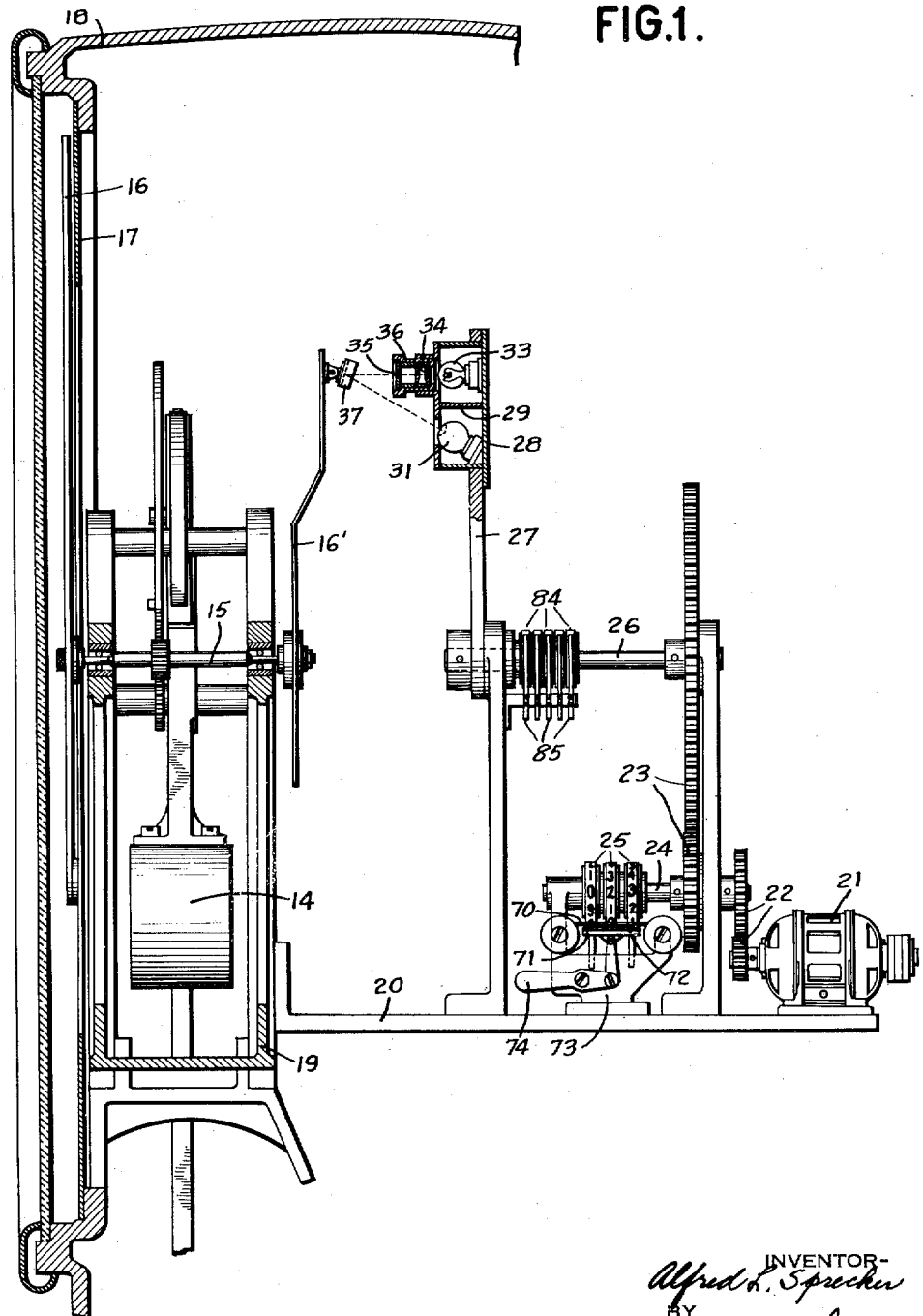
Fig. 1 is an end view of the upper part of the scale with the outer casing removed and associated with a novel control for auxiliary mechanism.

Referring to the drawings in detail, Fig. 4 shows a scale such as disclosed in Patent No. 1,870,233. In this scale, a load on the platform 10, operates base levers (not shown) to pull down on a draft rod 11 and rock an intermediate lever 12 counterclockwise. Lever 12 thereupon pulls down on a tape 13 to displace the pendulums 14 and the indicator shaft 15. The latter carries the pointer 16 which takes a position corresponding to the load and indicates the load on the dial chart 17. The scale is enclosed in a casing 18.

The pendulum and indicator system is mounted on a frame 19. To the back of this frame is fixed a shelf 20 on which is supported the auxiliary mechanism. The auxiliary mechanism comprises a motor 21 which through gearing 22 and 23 respectively rotates the shaft 24 of the registering or printing wheels 25 and the shaft 26 which carries arm 27. At its upper end arm 27 has mounted thereon a triangular shaped housing 28, separated by a partition 29 into upper and lower compartments. In the lower compartment are mounted three transversely spaced apart photocells 30, 31, and 32, each directly behind a small opening in the front wall of the housing 28. In the upper compartment is mounted a light bulb 33 from which a beam of light is projected by a system of lenses 34 through a small opening 35 in the front closure of the tube 36 carrying the lenses.

The shaft 15 of the pointer 16 carries at the rear of frame 19 a dummy pointer 16' provided at its upper end with a mirror 37 having three faces, 38, 39, and 40 angularly disposed relative to each other in a transverse direction. The central face 39 is so disposed relative to the direction of the beam projected by lenses 35 as to reflect the beam downwardly towards the central cell 31. When the face 38 of the mirror intercepts the beam of light, it directs it onto the cell 32, while face 40 of the mirror is adapted to reflect the beam onto cell 30.

The part of the auxiliary mechanism or means comprising gearing 23, shaft 26, commutator rings 84, arm 27, housing 28, and the elements carried by the housing may be designated, for convenience, a follow-up mechanism or one which follows a load responsive or regulated part, namely dummy pointer 16' to the load position. Any movable part of the auxiliary mechanism may also be appropriately termed a settable device; this term including, for example, the load registering printing wheels 25. Further any part of the auxiliary mechanism may, for convenience, be referred to as an auxiliary device. The correct, normal, and desired relative position between the scale parts and the follow-up mechanism is with a predetermined, narrow central strip of the center face 39 of the mirror directly in front of and intercepting the beam of light from the lenses 35 and reflecting it onto cell 31. This is also the relative position at zero load.

Referring to the circuit diagram (Fig. 3) at normal relative position of the follow-up mechanism and scale parts, face 39 of the mirror will be intercepting the beam of light furnished by lamp 33 and reflecting it onto cell 31. Lamp 33 is lit by the following circuit: Assuming manual switch 42 has been closed, current will flow from the + terminal of a D. C. supply, through switch 42, line 43, line 44, lamp 33, and return line 45 to the — terminal of the D. C. supply. The mirror and follow-up mechanism having been assumed at their correct relative position, lamp 33 will project a beam of light on face 39 of the mirror which will reflect the beam onto cell 31. Energization of the cell 31 causes its amplifier B to energize the connected relay R—31 to close contacts 46. Closing of contacts 46 completes the following circuit: From the + terminal of the D. C. supply through line 43, line 47, relay contacts 46, magnet 48, line 49, and through line 45 to the — terminal of the D. C. supply. Relay 48 being energized will attract its armature 50 to open contacts 51. When contacts 51 are open, they prevent completion of the circuits which cause movements in either direction of motor 21 and the follow-up mechanism operated by the motor. Therefore, whenever the parts of the scale and the follow-up mechanism are in normal relative position, motor 21 will be at rest. This is true at zero load as in this position, the normal relative position has been reached.

Assume now a load is placed on the platform 10 to displace the pointers 16 and 16' clockwise to a load point corresponding to the load as indicated by pointer 16 on dial chart 17. As the pointer 16' moves clockwise, mirror 37 moves likewise so that face 39 of the mirror moves away from the beam of light and face 40 moves into the path of the beam and reflects it onto cell 30. As soon as face 39 departs from the beam of light, cell 31 is no longer energized and the circuit through relay 48 is effectively broken, permitting spring 52 to restore armature 50 and close contacts 51. Now, when the reflecting face 40 illuminates cell 30, the latter is energized and its amplifier A energizes relay R—30 to close contacts 53, completing the following circuit: From + terminal of the D. C. supply, through line 43, line 54, contacts 53, relay 55, line 56, contacts 51, line 49, and line 45, to the — terminal of the D. C. supply. Relay 55 being energized, attracts armature contact blades 57 and 58, closing contacts 59 and 60. Closing of contacts 59 establishes a holding circuit through relay 55, shunting out the contacts 53. Thus, when reflecting face 40 passes the beam of light and no longer energizes cell 30, the relay 55 will still be energized to maintain contacts 59 and 60 closed. It is necessary to provide the holding circuit for relay 55 as when a load is placed on the scale moving mirror 37 clockwise, the reflecting face 40 may move past the beam of light before the follow-up mechanism catches up to it so that the energization of cell 30 may be only momentary. For this reason, the holding circuit through relay 55 is established so that the follow-up mechanism will continue to follow the mirror even though its face 40 has moved past the beam of light.

Contacts 60 controlled by relay 55, when closed, complete a circuit as follows: From the + terminal of the A. C. supply through line 62, contacts 60, line 63, motor field 64, and line 65 to the — terminal Q of the A. C. supply.

When motor field 64 is energized, it sets motor 21 rotating in a direction to cause arm 27 and the photocell device carried thereby to follow the movement of the mirror 37 and the pointers 16 and 16' and also rotating printing wheels 25 in an adding direction. The pointers 16 and 16' and mirror 37 will come to rest at the load point corresponding to the load on the scale platform. It is desired to stop the follow-up mechanism at the same load point. As described above, motor 21 has been set in operation to move the photocells clockwise, following the movement of the mirror 37. Mirror 37 being now at rest, the follow-up mechanism continues to move clockwise and the beam of light projected by the follow-up mechanism will first strike face 40 of the mirror. This will not change the operation of the motor which has been started by the reflection of the beam from face 40 onto cell 30. The follow-up mechanism therefore continues in motion, and the projected beam of light passes from reflecting face 40 to the central face 39. The beam of light is very narrow so that the center face 39 will reflect it through the opening in front of cell 31 only when a narrow central strip of the face 39 has reached a predetermined position in front of the beam. The beam will then be reflected onto the central cell 31, which as hereinbefore described, will cause energization of relay 48 to open contacts 51. The opening of contacts 51 breaks the circuit through relay 55, thereby opening armature contacts 59 and 60 to deenergize the motor field 64 and cause the motor to stop. The follow-up mechanism operated by the motor will thereupon stop with the narrow central strip of the reflecting face 39 in front of the light beam from lamp 33. This is the correct normal, relative position between the scale parts and the follow-up mechanism, as above explained. During the movement of the follow-up mechanism, the printing wheels 25 have been rotated to indicate the load. A record may now be obtained from the wheels.

For this purpose, an inking ribbon 70 is located between the printing wheels and the platen 71. A card 72 or other record-receiving medium is placed on the platen which is vertically slidably mounted on the frame 73. The handle 74 is then operated to move the platen 71 upwardly and cause the wheels 25 to print the load record on the card 72.

When the load is removed from scale platform 10, the pointers 16 and 16' and mirror 37 return counterclockwise, as viewed in Fig. 4. The reflecting face 39 will pass by the beam of light, its associated cell 31 and relay 48 will be deenergized and contacts 51 will be closed. As the mirror passes the beam of light counterclockwise, the reflecting face 38 will intercept the beam and project it onto the cell 32, causing its amplifier C to energize relay R—32 to close contacts 75 which will complete a circuit through magnet 76 in the same manner as described in connection with magnet 55. Magnet 76 will thereupon close contacts 78 and 79. Contacts 78 will maintain the circuit through magnet 76 even though cell 32 is no longer energized. Contacts 79 when closed complete a circuit as follows: from the + terminal of the A. C. supply, through line 62, contacts 79, line 80, motor field 81, and back to the — terminal Q of the A. C. supply. Energization of field 81 will set the motor in operation to move the photocells counterclockwise to follow the return movement of the mirror 37, at the same time effecting reverse or zeroizing movement of the printing wheels 25. When mirror 37 comes to rest at zero load point, the follow-up mechanism continues in motion and the light beam passes from reflecting face 38 to reflecting face 39. As soon as the central part of the face 39 intercepts the beam, it reflects it onto cell 31, energizing the latter and operating relay 48 to open contacts 51, thereby breaking the circuit through magnet 76 and opening contacts 79 to deenergize the motor field 81. The motor will thereupon stop with the follow-up mechanism in correct position relative to the mirror 37. The return of the mirror and the other movable scale parts to zero load position will thus cause the follow-up mechanism to likewise return to zero position and printing wheels 25 will be completely zeroized.

It may be understood from the above the follow-up mechanism will automatically move in the same direction as and under control of the movable scale parts and to the same extent. Should the follow-up mechanism overrun the correct relative position, or should the pointer and mirror associated therewith oscillate, the control of the follow-up mechanism will nevertheless cause the latter to assume the correct relative position to the scale parts.

The appropriate circuit connections to the cells of the follow-up control are made through commutator slip rings 84 on the shaft 26 of the follow-up mechanism, coacting with brushes 85 of the commutator.

The operation of the parts will now be briefly described. A load is placed on the platform 10, swinging pendulums 14 and rotating pointers 16 and 16' clockwise. The pointer 16 will indicate the load on the dial chart 17. Pointer 16' will carry its mirror 37 to the load point and during its movement, reflecting face 40 will intercept the beam projected by lamp 33 through lenses 35 and reflect it onto the photocell 30. This will result in energizing motor field 64 to set the motor in operation to cause the photocells to follow the pointer to the load position and moving the printing wheels to register the load. After a record has been taken from the wheels 25 by the operation of handle 74, the load is removed and the scale parts return to zero position. During the return movement, reflecting face 38 intercepts the light beam and reflects it onto cell 32 energizing the cell and causing motor field 81 to become operative to rotate the motor 21 in a direction to return the follow-up mechanism to initial, zero position. The mechanism wil continue to move until a predetermined, narrow, strip of the reflecting face 39 intercepts the beam and energizes cell 31 to close a circuit through relay 46, open contacts 51 and break the circuit through motor field 81, bringing the motor to a stop.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In combination, a force responsive mechanism movable variable extents in accordance with the magnitudes of the forces, an auxiliary device, motive means for the latter, and a control for said motive means including a plurality of control elements physically spaced from and free of reactive influence on the force responsive mechanism, one of said elements being controlled by the force responsive mechanism to cause the motive means to impart forward movement to the auxiliary device, and another of said elements being controlled by the force responsive mechanism to cause the motive means to impart reverse movement to the auxiliary device, there being still another of said control elements controlled by the force responsive mechanism when the auxiliary device is in normal relative position to the force responsive mechanism to render the other control elements ineffective.

2. In combination, a load responsive mechanism, an auxiliary device, motive means for actuating the latter, a control for said motive means including a first control element and a second control element successively and only one at a time cooperable with the load responsive mechanism, instrumentalities controlled by cooperation of said first control element with the load responsive mechanism for causing the motive means to move the auxiliary device in accordance with the movement of the load responsive mechanism, and means controlled by cooperation of said second control element with the load responsive mechanism, after cessation of cooperation between said first control element and the load responsive mechanism, to render the aforesaid instrumentalities ineffective when the auxiliary device has been moved to a position correctly corresponding to the position of the load responsive mechanism.

3. The machine as defined in claim 2, further characterized by the fact that a common movable support is provided for rigidly mounting both the first and the second control elements in spaced, side-by-side relationship and that connections are provided between the motive means and said support for actuating said support to cause the first and second control elements to successively come into cooperation with the load responsive mechanism.

4. The machine as defined in claim 2, further characterized by the fact that said control includes a third control element cooperable with the load responsive mechanism, after the second element ceases cooperation with said mechanism, for causing the motive means to move the auxiliary device in a direction opposite to that in which it had been moved to the load-corresponding position.

5. In a scale, a load responsive member movable proportionally to the magnitude of the load to different load positions, a follow-up mechanism, a single automatic actuator therefor, and a control for the actuator including sensing means provided in the follow-up mechanism and mounted to move in a path constantly spaced from the locus of travel of said load responsive member and constructed to sense the position of said member while in said spaced path and free of reactive influence on the member, said sensing means being capable while moving in its path of completely passing the load responsive member, means controlled by cooperation of the sensing means with said member when the sensing means is behind and at a lower load position than said member for automatically causing said single actuator to move the follow-up mechanism and sensing means towards the member in a load ascending direction, and means controlled by cooperation of the sensing means with the member when the sensing means is past the member, ahead of and at a higher load position than the member, for automatically causing said single actuator to move the follow-up mechanism and sensing means toward said member in a descending load direction.

6. In combination, a load support, weighing mechanism operated thereby including an element variably stationed in accordance with the magnitude of the load at different positions, an auxiliary device, an automatic actuator for automatically operating the auxiliary device, photocell means, a source of radiant energy for energizing the photocell means selectively in accordance with operation of the aforesaid element, a circuit controlled by the energization of the photocell means to set the auxiliary device in operation by the actuator, and another circuit controlled by energization of the photocell means upon the auxiliary device having been operated in accordance with the position and displacement of said element for stopping operation of the auxiliary means by the actuator.

7. In combination, a load support, weighing mechanism operated thereby including an element variably stationed in accordance with the load at different load positions, an auxiliary device, an automatic actuator for automatically moving the auxiliary device, a photocell, a source of radiant energy for energizing the photocell momentarily in accordance with operation of the aforesaid element to set the auxiliary device in operation in one direction by the actuator, means for continuing the auxiliary device in operation in said direction by the actuator after deenergization of the photocell, and means for stopping operation of the auxiliary device when the latter has been actuated in accordance with the displacement of said element to the load position corresponding to the load acting on said support.

8. In combination, load weighing mechanism, auxiliary means, an automatic actuator for automatically operating the auxiliary means, a photocell, a source of radiant energy for momentarily energizing the photocell under control of the weighing mechanism, a circuit controlled by the momentary energization of the photocell for setting the auxiliary means in operation by the actuator, a holding circuit for maintaining the auxiliary means in operation after deenergization of the photocell, a second photocell energized by said source under control of the weighing mechanism when the auxiliary means has been operated in accordance with the action of the weighing mechanism, and a third circuit controlled by energization of the second cell for stopping operation of the auxiliary means by the actuator.

9. In combination, a load support, weighing mechanism operated thereby, auxiliary means, an automatic actuator for automatically moving the auxiliary means, means for automatically setting the auxiliary means in operation by the actuator upon departure of the weighing mechanism from zero position, a photocell, a source of radiant energy for energizing the cell under control of the weighing mechanism when the auxiliary means has been operated in accordance with the reaction of the weighing mechanism to the load, and a circuit operated by energization of said cell to thereupon stop the auxiliary means.

10. In a scale, a load support, weighing mechanism operated by the load support, an automatic actuator, registering means automatically operated by the actuator, a photocell, a source of radiant energy for energizing the cell under control of the weighing mechanism when the registering means has been operated correspondingly to the load, and a circuit operated by energization of the photocell to stop operation of the registering means by said actuator and cause it to remain in its operated load corresponding position.

11. In a scale, a load support, weighing mechanism operated by the load support and including an element variably stationed in accordance with the load at different load points, registering wheels, photocell means, a source of radiant energy for selectively energizing the photocell means under control of aforesaid element, an automatic actuator controlled by the photocell means for automatically operating the registering wheels proportionally to the magnitude of the load, and means for causing the same actuator to reverse operation of the registering wheels when the applied load is removed from the load support.

12. In a scale, a load support, weighing mechanism operated by said load support, and a follow-up mechanism including a control device physically separate from the weighing mechanism and incapable of reactive influence on the latter and having a zero position relative to the weighing mechanism, an automatic actuator independent of the weighing mechanism for automatically operating the follow-up mechanism and the control device, and means coacting with the device and weighing mechanism effective upon the control device reaching said zero position relative to the weighing mechanism to stop operation of the follow-up mechanism and control device by the actuator, and means for causing return movement of the control device and follow-up mechanism in proportion to the weight of part of the load removed from the load support.

13. In a scale, a load support, weighing mechanism operated by the load support, a follow-up mechanism having a zero position relative to the weighing mechanism, an automatic actuator for automatically moving the follow-up mechanism, an auxiliary device settable by the actuator, and electrical means including a photocell energized by the weighing mechanism when the follow-up mechanism reaches its zero position relative to the weighing mechanism to vary the electrical means for controlling the actuator to set the auxiliary device correspondingly to the load.

14. In a scale, load operated weighing mechanism, a reflector having relatively inclined faces, a source of radiant energy, photocells upon which the reflector faces selectively direct energy from said source, means operated by the weighing mechanism for moving the reflector and photocells relatively, auxiliary mechanism and means selectively controlled by the energization of the photocells for operating the auxiliary mechanism in accordance with the reaction of the weighing mechanism to the load.

ALFRED L. SPRECKER.